INVENTORS
Loney R. Duncan Jr.
James J. Smisloff
BY Moody and Phillion
Attorneys

INVENTORS
Loney R. Duncan Jr.
James J. Smisloff
BY Moody and Phillion
Attorneys

United States Patent Office 3,305,776

Patented Feb. 21, 1967

3,305,776

PARALLEL RESONANCE DISCRIMINATOR INCLUDING AN INDUCTIVELY COUPLED TUNED CIRCUIT

Loney R. Duncan, Jr., and James J. Smisloff, Marion, Iowa, assignors to Collins Radio Company, Cedar Rapids, Iowa, a corporation of Iowa Filed Sept. 24, 1962, Ser. No. 225,571
5 Claims. (Cl. 324—57)

This invention relates, generally, to discriminators and, more particularly, to an impedance discriminator which functions to respond to the currents in the two paths of a parallel circuit to determine differences in impedances in the said two paths and to produce a D.C. voltage whose polarity and magnitude indicate, respectively, the polarity and magnitude of the difference in said impedances.

There are in the prior art many situations when it is desirable to tune a parallel circuit in accordance with a change in frequency in a received or transmitted signal. Some examples of such applications include antenna coupling networks, receiver filter networks, and the tank circuit in a transmitter. In some instances, a conventional frequency discriminator such as a Foster-Seely discriminator has been employed to accomplish the tuning of the tank circuit in the above applications. As a specific example, in some antenna coupling networks tuning is effected automatically by a load discriminator and a phasing discriminator which are coupled to the R-F transmission line between the transmitter and the antenna coupling network. The phasing discriminator in some cases is of the Foster-Seely type. Since the frequency characteristics of a Foster-Seely discriminator is S shaped with a limited operating bandwidth, the pull-in range of the antenna coupling network will be similarly limited.

It would mark a definite improvement in the art to provide a circuit means which will function to automatically detect a variation between the antiresonant frequency of a tank circuit and the frequency of a signal supplied thereto, and to tune such tank circuit to the frequency of the received signal over a wider range of operating frequencies than has been done heretofore.

Of course, there are instances where it is desirable to maintain a constant relationship between the values of the impedances of two branches of a parallel circuit other than in the case of a parallel circuit. However, the embodiment of the present invention comprising a tank circuit is believed to be one of the more useful embodiments and will be employed as the means of fully describing the invention.

It is a primary object of this invention to provide a means for maintaining a constant ratio between the impedances of the two branches of a two-branch parallel circuit.

It is another object of the present invention to provide such a tuning means which will tune a tank circuit to a very close approximation of the frequency of a received signal, and which has a large pull-in range.

A third object of the invention is to provide a relatively simple and inexpensive circuit for detecting deviation between the frequency of a received signal and the antiresonant frequency of a parallel tuned circuit.

A fourth object of the invention is a simple and inexpensive control circuit for tuning a tank circuit to the frequency of a received signal over a wide pull-in frequency range.

A fifth aim of the invention is the improvement of means for tuning parallel circuits, generally.

It should be noted that through this specification, the tank circuit will be spoken of as being tuned to its antiresonant condition. Technically speaking, when a tank circuit is tuned to its antiresonant condition, the capacitive reactance of one parallel branch is equal exactly to the inductive reactance of the other parallel branch of the tuned circuit. As will be discussed in detail later herein, the present invention functions on the principle of equating the two currents in the two branches of the parallel tuned circuit. Due to the presence of resistance in the inductive branch of the circuit, the condition where the currents in the two branches of the circuit are equal is not the precise condition of antiresonance. However, when the Q of the circuit is relatively large, such as several hundred or more, and the resistance contained in the inductance is relatively small, the point at which the currents in the two branches are equal is, for most practical purposes, the point of antiresonance. Thus, even though the tuned condition of the tank circuit herein is referred to as the antiresonant condition, it is in actuality not quite at antiresonance for the reasons discussed above.

In accordance with the invention, there is provided a signal source and a tank circuit to which the signal from the source is supplied. To closely approximate the antiresonant frequency of the parallel tuned circuit to the frequency of the applied signal, there is provided a pair of circuit paths, one each of said circuit paths being inductively coupled to one of the branches of the tank circuit. Such inductive coupling is loose, with a resultant small mutual inductance, so that the reactive inductance created thereby is small compared to the principal impedances of the two branches of tank circuit. The circuit coupled to the capacitive branch of the tank circuit is rectified and filtered to produce a D.C. voltage which is proportional to the current in said capacitive branch of said circuit.

Similarly, the current induced in the circuit path coupled to the inductor branch of the tank circuit is rectified and filtered to produce a second D.-C. voltage whose magnitude is representative of the amplitude of the current in said inductive branch. The two D.-C. voltages are combined (subtracted) to produce a resultant D.-C. voltage whose amplitude and polarity are indicative of the amplitude difference in the currents in the two branches of the parallel tuned circuit and also which of the two branches contains the largest R-F current. If the antiresonance of the parallel tuned circuit is equal (substantially) to the frequency of the applied signal, the current in the two branches of the tuned circuit is equal so that the resultant combined D.-C. voltage also is zero.

As indicated above, the present invention functions to tune the tank circuit so that the impedances in the two branches thereof are equal. However, since the inductive branch contains some resistance, the over-all impedance of the tank circuit will be slightly capacitive in nature and will not be tuned precisely to antiresonance. For practical purposes, however, the point of antiresonance is approximated closely.

In accordance with a feature of the invention, the resultant combined D.-C. voltage can be employed to tune one of the reactive elements of the tank circuit in order to maintain the antiresonant frequency coincident with that of the received signal, as the frequency of the received signal varies. If large changes in the frequency of the received signal occur, such as by a switching means, for example, appropriate means can be provided to coarse adjust one or the other of the two reactive components of the tuned circuit. Then, fine adjustment of the tank circuit to antiresonant frequency can be effected by the discriminating circuit of this invention.

In accordance with another feature of the invention, the operating bandwidth of the present invention is quite broad and theoretically extends to infinity on the upper side and to zero frequency on the other side, inasmuch as the current difference in the two branches will become increasingly greater in a given polarity as the deviation from the nominal center frequency becomes increasingly greater.

The above-mentioned and other objects and features of the invention will be more fully understood from the following detailed description thereof when read in conjunction with the drawings in which.

Figure 1:
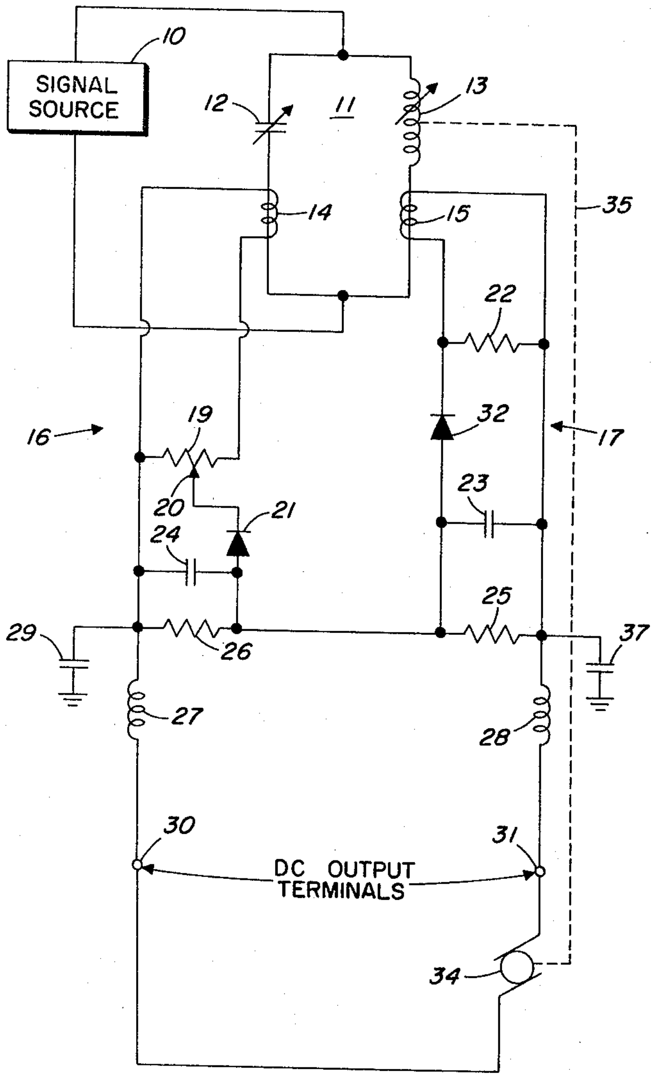
FIG. 1 shows a schematic sketch of the invention.

Referring now more specifically to FIG. 1, the output terminals of the signal source 10 are connected across the tank circuit 11 which is comprised of a variable capacitor 12 and a variable inductor 13; the components 12 and 13 forming the tank circuit proper. Each branch of the tank circuit, however, has some relatively small additional inductance therein due to the transformer couplings 14 and 15. Such transformer couplings, 14 and 15, are of the shielded toroidal type and are only loosely coupled to the tank circuit 11, thus providing reactances which are relatively small compared to the reactances produced by the capacitor 12 and the inductor 13, at the frequency of operation.

Generally speaking, the currents induced in the transformer windings 14 and 15 are rectified by diode means 21 and 32, respectively, to produce D.-C. voltages which combine across the output terminals 30 and 31 to produce a resultant D.-C. voltage whose polarity and magnitude indicating the particular branch of the tuned circuit 11 in which the largest current appears and the difference between the amplitudes of the two currents. The fact that a larger current appears in one branch of the tuned circuit than appears in the other branch of the tuned circuit is significant since it indicates that the antiresonant frequency of the tuned circuit is different from the frequency of the applied signal source, and also indicates whether the antiresonant frequency is above or below that of the signal source. The circuit preferably is designed so that if the antiresonant frequency is equal to the frequency of the applied signal, the D.-C. voltages produced as a result of the rectification of the current induced in windings 14 and 15 are equal, so that the resultant D.-C. voltage appearing across terminals 30 and 31 is "zero."

Looking now at each of the two circuit paths 16 and 17, separately, and considering first circuit 16, it can be seen that the R.-F. current induced in winding 14 appears across the load resistor 19 which has a tap 20 thereon.

The voltage appearing at the tap 20 produces a current which is rectified by the diode 21 and appears as a D.-C. voltage across the capacitor 24. It is to be noted that the capacitor 24 along with the resistor 26, inductor 27, and capacitor 29 form a filter circuit which produces a D.-C. potential at the terminal 30 which is substantially free of ripple.

In a manner similar to that of circuit 16, the circuit 17 functions to produce a D.-C. voltage from the R-F signal induced in winding 15. More specifically, the R-F current appearing across the load resistor 22 is rectified by diode 32 to produce a D.-C. voltage across the capacitor 23. The capacitor 23 co-operates with the resistor 25, inductor 28, and the capacitor 37 to form a filter network that removes substantially all of the ripple from the D.-C. voltage appearing at the output terminal 31.

It should be noted that at the lowest frequency encountered from signal source 10, the resistances of load resistors 19 and 22 are much less than the inductive reactances of the secondary windings of toroidal transformers 14 and 15, respectively, thus providing voltages across 19 and 22, which are proportional to the current flowing in the primary windings of 14 and 15, but which are independent of the signal source 10 frequency.

An examination of the circuit of FIG. 1 will show that the diodes 21 and 32 are both poled in such a manner that the resultant D.C. voltage appearing across the output terminals 30 and 31 represents the difference between the voltages across resistors 26 and 25. As a specific example of the operation, assume that the frequency of the applied signal is greater than the antiresonant frequency of the tuned circuit 11. In such event the R-F current through the variable capacitor 12 will be greater than the R-F current through the variable inductor 13 with the result that the D.-C. voltage produced across the resistor 26 will be greater than the D.-C. voltage produced across the resistor 25. Consequently, the D.-C. voltage at terminal 30 will be more positive than the D.-C. voltage at the terminal 31.

On the other hand, if the frequency of the applied signal from source 10 is less than the antiresonance frequency of the tuned circuit 11, the current through the variable inductor 13 will be greater than the current through the variable capacitor 12, so that the D.-C. voltage across resistor 25 will be greater than the D.-C. voltage across resistor 26. Thus, the potential of 31 will be more positive than the potential of terminal 30.

The D.-C. voltage appearing across terminals 30 and 31 can be employed to drive a servo motor 34 which, through mechanical linkage 35 functions to vary the inductance of the variable inductor 13 in the tank circuit 11. If desired, the capacitance of the variable capacitor 12 can be changed by relatively large increments to correspond with large changes in the signal source 10 frequency by means of the dial or switch (not shown), for example, which can be made to simultaneously vary the frequency of the signal received from source 10 and the capacitance of the capacitor 12. Fine adjustment between the frequency of the applied signal and the antiresonance frequency of the tuned circuit 11 is then effected by the discriminator circuit of this invention.

If desired, the linkage 35 from the servo motor 34 can be employed to vary the capacitor 12 to produce fine adjustment and the coarse adjustment can be accomplished by varying the inductor 13 with a manual switch or dial.

Alternately the linkage 35 from the servo motor 34 can be employed to vary both the variable inductor 13 and the variable capacitor 12 in a manner to provide a nearly constant $L/C$ ratio over large frequency range.

Figure 2:
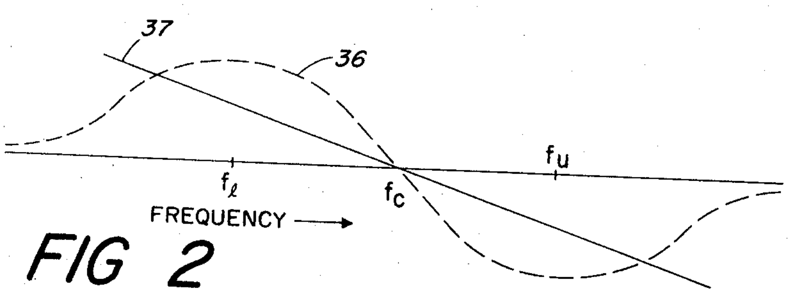
FIG. 2 shows the frequency response characteristic of the present invention as compared with a conventional frequency discriminator, such as a Foster-Seely discriminator.

Referring now to FIG. 2, there is shown a curve of the frequency response characteristics of the present invention in the embodiment employing a parallel tuned circuit and also a frequency response curve of conventional frequency discriminator such as, for example, a Foster-Seely discriminator. In FIG. 2 the dotted curve 36 typifies the frequency response characteristic of a Foster-Seely discriminator, with $f_c$ being the nominal center frequency of the discriminator, and with $f_l$ and $f_u$ representing, respectively, the lower and upper frequency limits or operation of such a discriminator. The curve 37 represents the frequency response characteristics of the present invention. Since the circuit of the present invention functions on the difference of amplitude of current in the two branches of the tank circuit and, further, since such differences in amplitude will only increase as deviation from the nominal center frequency increases, it follows that theoretically the lower frequency limit is D.C. and the upper frequency limit is infinite for a constant voltage signal source 10.

Practically speaking, for linear frequency response, the lower frequency limit is that for which the inductive reactance of the secondary windings of toroidal transformers 14 and 15 approach the resistance values of load resistors 19 and 22, and the upper frequency limit is governed by the losses in transformers 14 and 15 and circuit elements 12 and 13. Thus the present invention can be used to tune a tank circuit over much wider range of frequency than can be obtained with a Foster-Seely circuit.

Figure 3:
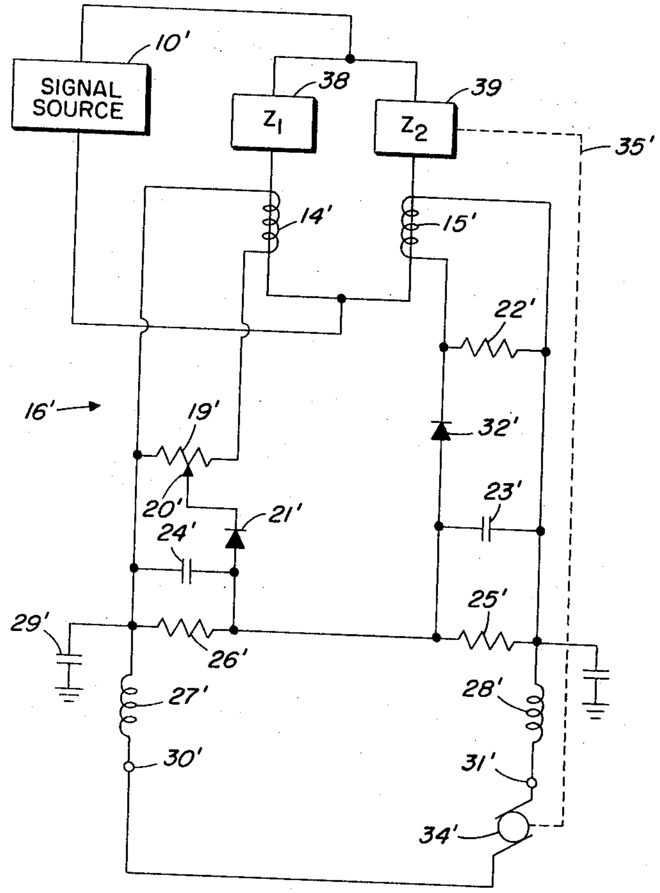
FIG. 3 shows a combination block diagram and schematic diagram of a more generalized form of the invention.

Referring now to FIG. 3, there is shown a more generalized form of the invention in which impedances 38 and 39 have been substituted for the capacitor 12 and inductor 13 of FIG. 1. In FIG. 3 it is shown that the present invention can be employed generally to detect differences of impedances in a parallel circuit. For example, the circuit can be designed such that the D.-C. output signal appearing across the terminals 30' and 31' is zero when the ratio of impedance $Z_2$ to impedance $Z_1$ is equal to some predetermined constant K. When either the impedance $Z_1$ or $Z_2$ incurs a change in value to change the constant K, there results a D.-C. voltage at the output terminals 30' and 31' which energizes the servo motor 34'. Energization of the servo motor 34' changes the value of impedance $Z_2$ to re-establish the ratio K. Such type of control circuit can be employed in situations other than where frequency control is desired, such as in the case of FIG. 1. For example, $Z_1$ and $Z_2$ may be subject to temperature changes which would upset the ratio K.

It is to be noted that the forms of the inventions shown and described herein are but preferred embodiments thereof and that various changes may be made in specific circuit details without departing from the over-all spirit and scope of the invention.

We claim:

1. In combination with a parallel tuned circuit tuned to the frequency of an applied input signal and comprising:

a capacitive branch and an inductive branch;

and a signal source for supplying an input signal across said parallel tuned circuit;

an impedance discriminator means for detecting differences in the impedances of the two branches of said parallel tuned circuit and comprising:

first circuit means reactively coupled to the capacitive branch of the parallel tuned circuit to produce a direct current signal whose amplitude is proportional to the amplitude of the alternating signal in said capacitive branch;

second circuit means reactively coupled to the alternating signal in the inductive branch of said parallel tuned circuit to produce a second direct current signal whose amplitude is proportional to the amplitude of the alternating signal in said inductive branch;

and means for combining said first and second direct current signals to produce a resultant direct current signal whose amplitude and polarity are indicative of the amount and sense of the difference in the impedances of the two branches of said parallel circuit.

2. An impedance discriminator means in accordance with claim 1 comprising means responsive to said resultant direct current signal to adjust the relative values of the impedances of the two branches of said first parallel circuit to cause the ratio of said impedances to assume a predetermined value.

3. Frequency difference detection means for detecting differences between the impedances of a parallel tuned circuit tuned to the nominal center frequency of an applied R-F signal and comprising:

a capacitive leg;

an inductive leg in parallel with said capacitive leg;

and an R-F frequency signal applied across said tuned circuit;

said frequency detection means comprising:

first circuit means inductively coupled to the R-F signal in said capacitive leg to produce a first direct current signal whose amplitude is proportional to the amplitude of the R-F signal in said capacitive leg;

second circuit means inductively coupled to the R-F signal in said inductive leg to produce a second direct current signal whose amplitude is proportional to the amplitude of the R-F signal in said inductive leg;

and means for combining said first and second direct current signals to produce a resultant direct current signal whose amplitude and polarity varies in accordance with the amount and sense of the difference between the antiresonant frequency of the tuned circuit and the frequency of the R-F signal applied thereacross.

4. Frequency difference detection means in accordance with claim 3 comprising means responsive to said resultant direct current signal to adjust the relative values of said capacitive leg and said inductive leg of said tuned circuit to cause the antiresonant frequency of said tuned circuit to coincide with the frequency of the R-F signal applied thereacross.

5. Frequency deviation detection means for detecting differences between the frequency of antiresonance of a parallel tuned circuit, tuned to the nominal center frequency of an applied R-F signal, and the frequency of the R-F signal impressed across said tuned circuit, and comprising:

first inductive means coupled to a first branch of said tuned circuit;

second inductive means coupled to a second branch of said tuned circuit;

first means for rectifying the signal induced in said first inductive means to produce a first direct current signal whose magnitude is proportional to the magnitude of the R-F signal in said first leg of said tuned circuit;

second means for rectifying the signal induced in said second inductive means to produce a second direct current signal whose magnitude is proportional to the magnitude of the R-F signal in said second leg of said tuned circuit;

and means for combining said first and second direct current voltages to produce a resultant direct current voltage whose magnitude and polarity are proportional to the magnitude and the sense of the difference between the antiresonant frequency of the tuned circuit and the frequency of the R-F signal applied thereacross.

References Cited by the Examiner

UNITED STATES PATENTS

| | | | |
|---|---|---|---|
| 1,530,169 | 3/1925 | Grimes | 334—71 X |
| 1,553,390 | 9/1925 | Nyman | 343—745 X |
| 2,290,327 | 7/1942 | Hansell | 324—81 X |
| 3,101,066 | 11/1961 | Kwast | 324—81 X |

FOREIGN PATENTS

| | | |
|---|---|---|
| 690,158 | 4/1953 | Great Britain. |
| 690,292 | 4/1953 | Great Britain. |

OTHER REFERENCES

Radio Electronics, "Clamp Type A.C. Microammeter," February 1960, page 39.

WALTER L. CARLSON, *Primary Examiner.*

A. E. RICHMOND, W. H. BUCKLER,
E. E. KUBASIEWICZ, *Assistant Examiners.*